United States Patent [19]

Yaros

[11] 4,098,137

[45] Jul. 4, 1978

[54] PULLEY AND METHOD OF MAKING SAME

[75] Inventor: Anthony P. Yaros, Pinconning, Mich.

[73] Assignee: Peters Manufacturing Company, Inc., Kawkawlin, Mich.

[21] Appl. No.: 723,572

[22] Filed: Sep. 15, 1976

[51] Int. Cl.² .................... F16H 55/44; B21D 53/26
[52] U.S. Cl. .................... 74/230.8; 29/159 R
[58] Field of Search .............. 29/159 R; 74/230.8, 74/230.3

[56] References Cited

U.S. PATENT DOCUMENTS

| 2,929,345 | 3/1960 | Zatyko, Sr. | 74/230.8 X |
| 3,962,926 | 6/1976 | Kotlar | 74/230.8 |
| 3,977,264 | 8/1976 | Sproul | 74/230.8 |

Primary Examiner—Leonard H. Gerin

[57] ABSTRACT

A pulley including a cup shaped hub having a cylindrical sidewall provided with a radially extending annular, multiple wall thickness fold at the axially inner end thereof, and a radially outwardly flaring flange at the axially outer end thereof. One aspect of the invention comprises the method of making the pulley including the step of forming the axially inner, multiple wall thickness fold prior to forming the radially outwardly flaring terminal end flange.

27 Claims, 15 Drawing Figures

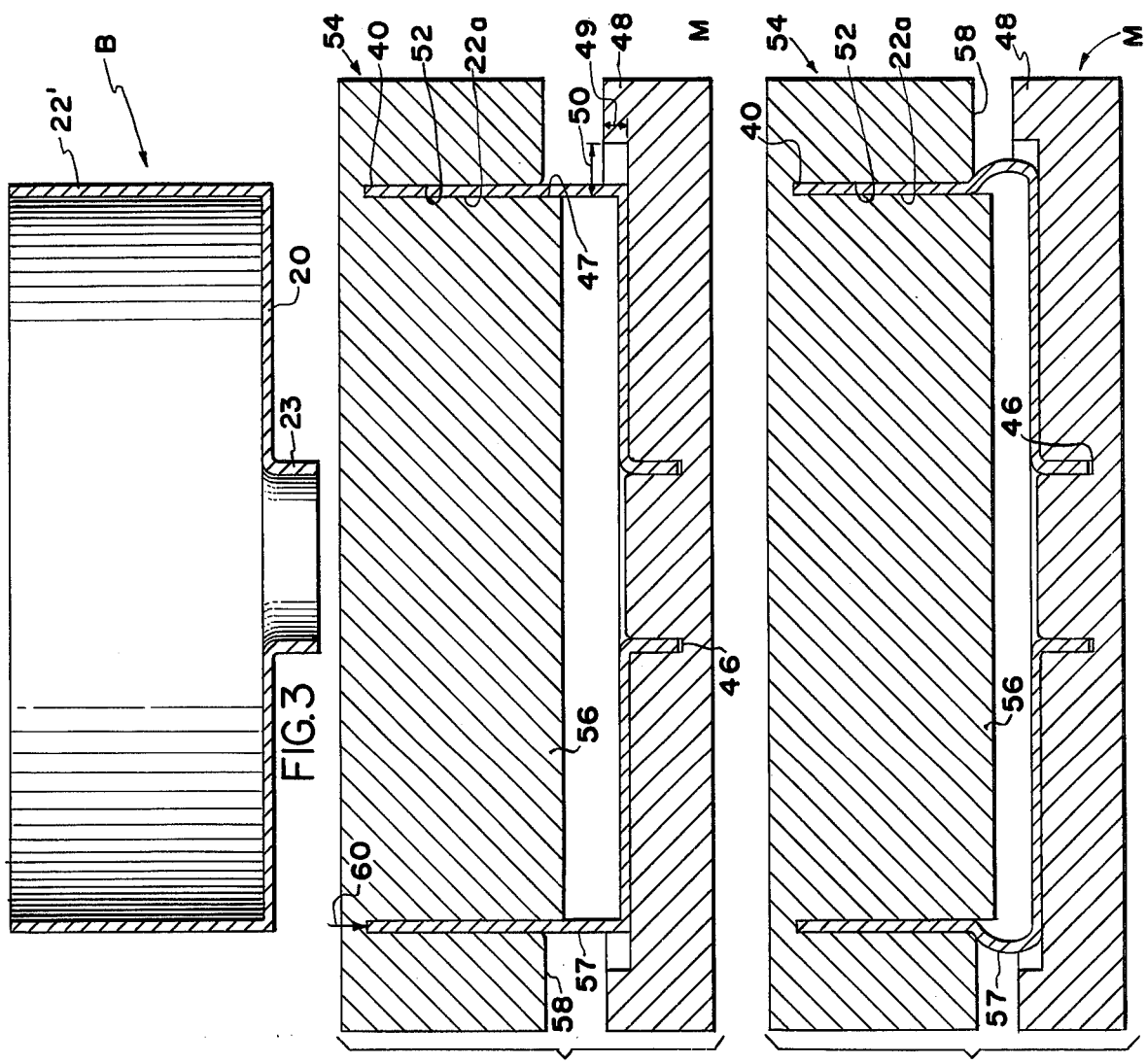

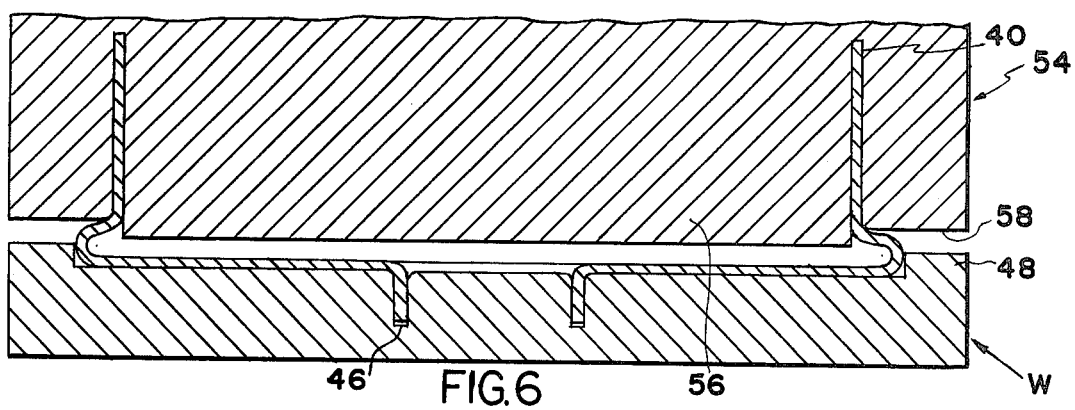
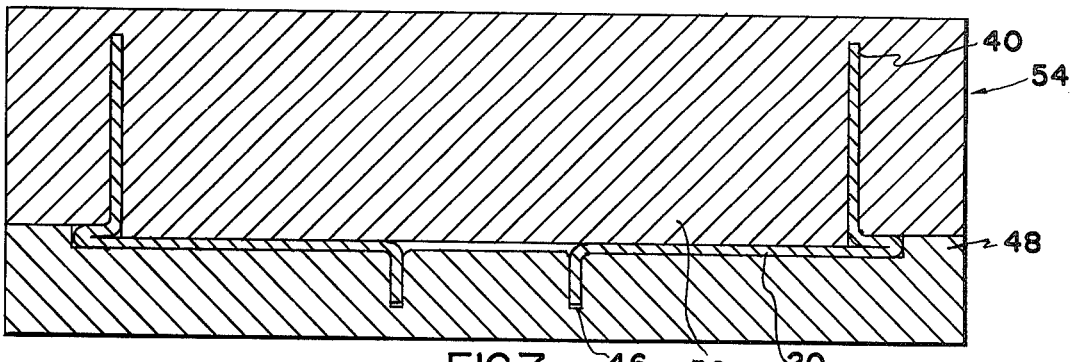
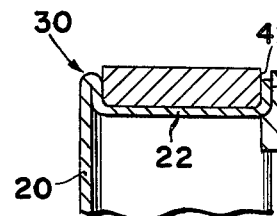
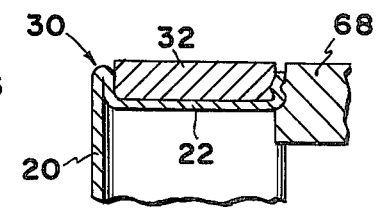
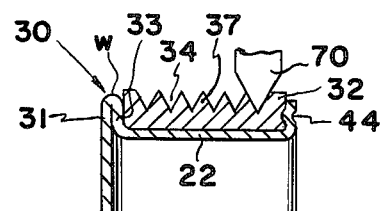
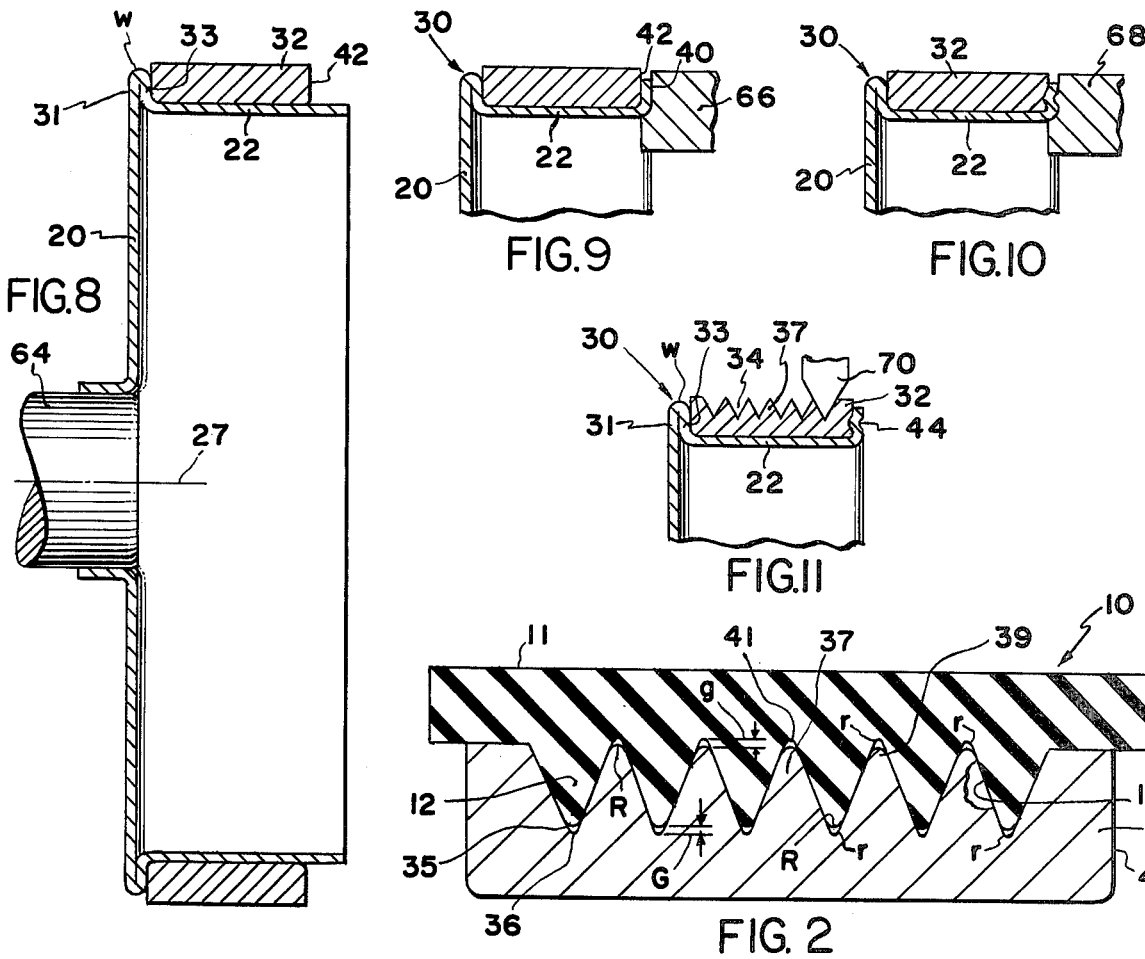
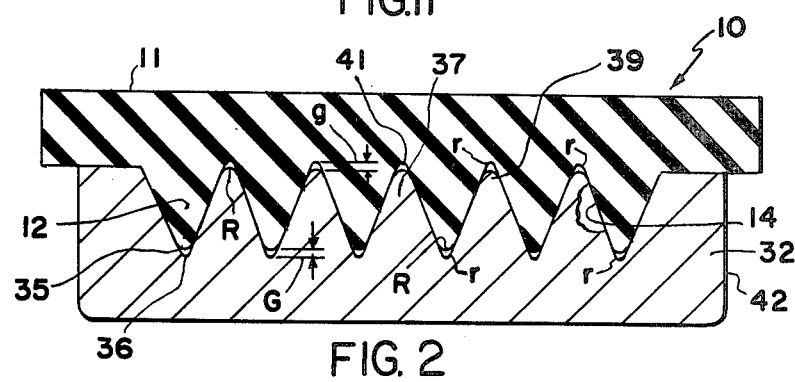

PULLEY AND METHOD OF MAKING SAME

BACKGROUND OF THE INVENTION

This invention relates to a multi-groove pulley and method of making same.

An internal combustion engine installed in an automobile conventionally mounts various automotive accessories such as an electrical generator, water cooling fan, a water pump and an air conditioning unit. The accessories are driven via a plurality of axially spaced, endless drive belts trained around a multigroove pulley, which is mounted on an engine drive shaft, and a plurality of pulleys mounted on the drive shafts of the various accessories. One endless drive belt may, for example, be trained around a sheave portion of a multi-groove drive pulley and a driven pulley mounted on the drive shaft of an electrical generator. Another endless belt may be trained around an axially spaced sheave portion of a multi-groove drive pulley, an idler pulley, and a driven pulley mounted on the drive shaft of a fan or a power steering unit.

With the advent of petroleum shortages, it is particularly important that the gross weight of automobiles be minimized so that the fuel consumption rate is decreased. It is important therefor, that the gross belt-weight and the gross pulley weight of automobile engines be minimized. Some prior art belt drive pulleys have been cast or manufactured from machined bar stock and are relatively heavy and expensive to manufacture. The pulley constructed according to the present invention is lightweight and particularly adapted for use with a single, endless, multi-pyramid, drive belt which replaces the plurality of individual belts utilized heretofore on automobile internal combustion engines.

Pulleys constructed according to the present invention can be substituted for the internal combustion engine drive pulley, the idler pulleys or any or all of the plurality of driven pulleys of all of the automobile accessories. An internal combustion engine employing a multi-pyramid, serpentine belt will mount all of the pulleys in one vertical plane and the endless multi-pyramid belt will be trained therearound. Accordingly, it is an object of the present invention to provide a new and useful, light weight, multigroove pulley for an endless multi-pyramid belt.

It is another object of the present invention to provide a new and novel method of inexpensively manufacturing a light-weight pulley.

It is another object of the present invention to provide a pulley and method of making same which will minimize pulley eccentricity.

Yet another object of the present invention is to provide a multi-groove pulley having a one-piece, cup-shaped mounting member mounting a multi-groove, belt receiving cylinder.

A further object of the present invention is to provide a pulley and method of making a pulley having a cup-shaped mounting member provided with an annular, axially disposed multi-wall thickness, retaining flange at the axially inner end and an annular, radially outwardly flaring retaining opposed, retaining flange at the axially outer end.

Still another object of the present invention is to provide a method of making a pulley including the step of radially outwardly bulging and folding an axially inner, annular portion of a sidewall of a cup shaped member and thereafter radially outwardly flaring an annular, terminal end portion of the sidewall to provide a retaining flange.

A still further object of the present invention is to provide a method of making a pulley for a multi-pyramid belt including the steps of outwardly bulging an axially inner portion of a cylindrical sidewall of a cup-shaped member, to form an axially inner, retaining flange, mounting a hollow, cylindrical, belt receiving member on the cylindrical sidewall and thereafter bending the terminal end portion of the sidewall into bearing engagement with the outer end wall of the cylindrical, belt receiving member.

Other objects and advantages of the present invention will become apparent to those of ordinary skill in the art as the description thereof proceeds.

SUMMARY OF THE INVENTION

A pulley including a hollow, cup-shaped mounting member having a radially extending end wall rotatable about an axis and an axially extending sidewall having a radially extending multi-wall thickness, annular flange at its axially inner end and a radially outwardly flaring annular retaining flange at its axially outer end, and a multi-groove, belt receiving cylinder mounted on said sidewall between, and in abutting relation with, the multi-wall thickness flange and the axially outer end flange. The pulley is manufactured by initially forming the multi-wall thickness annular flange mounting a belt receiving sheave on the sidewall, and thereafter outwardly flaring the terminal annular end of the sidewall into abutting relation with the belt receiving sheave.

The present invention may more readily be described and understood by reference to the accompanying drawings in which:

FIG. 1 is a sectional, side elevational view illustrating a pulley constructed according to the present invention;

FIG. 2 is a greatly enlarged sectional view illustrating the belt and pulley sheave;

FIG. 3 is a sectional, side elevational view illustrating a a cup-shaped metal blank at the commencement of manufacture;

FIGS. 4–11 illustrate successive steps in the process of making the pulley illustrated in FIGS. 1 and 2.

DESCRIPTION OF THE PREFERRED EMBODIMENT

Figure 15:
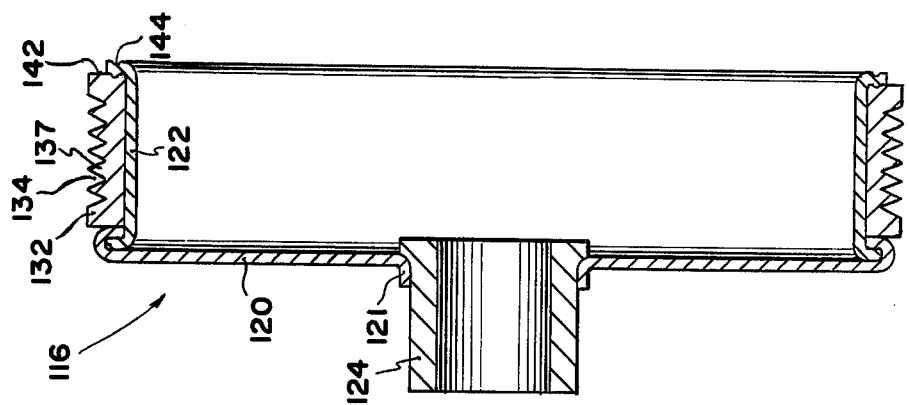
FIGS. 12–15 are sectional side views illustrating successive steps of making a slightly modified pulley construction.
Figure 14:
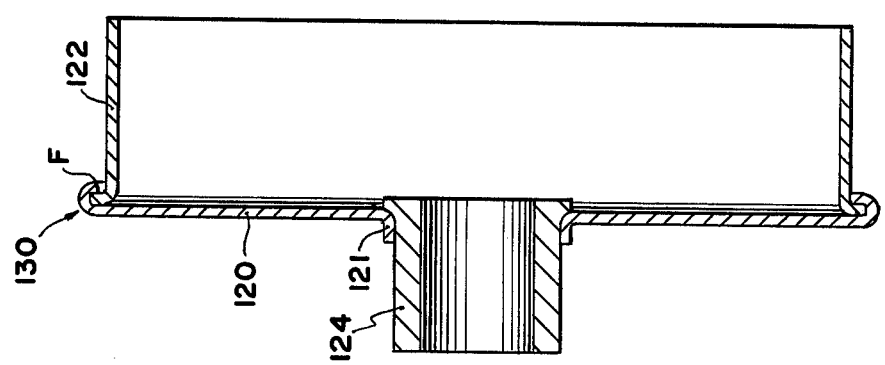

A pulley constructed according to the present invention is particularly adapted for use with an endless, serpentine belt, generally designated 10, having a smooth exterior surface 11 and an inner surface provided with a plurality of generally V-shaped, parallel, circumferentially extending, pyramids 12 separated by a plurality of circumferentially extending grooves 14. The axial width of the belt 10 is substantially greater than the radial thickness thereof so that the belt can conform to the curvature of a relatively small diameter pulley. The belt 10 may comprise a combination of materials including rubber, nylon, and suitable reinforcing members. The belt 10 replaces a plurality of endless drive belts (not shown) conventionally utilized to couple the drive shaft of an internal combustion engine to various automotive accessories such as an electrical generator, an air blowing fan, an air conditioning unit and a power steering unit. For a belt of a given axial width, the plurality of circumferentially extending pyramids 12 provide a greatly increased bearing surface and thus substantially increases the torque which can be transmitted via the multi-pyramid belt 10 compared to a belt which does not include the pyramids 12.

A multi-groove pulley constructed according to the present invention is generally designated 16 and includes a generally hollow, cup-shaped pressed metal body 18 having an endwall 20 and an axially extending, hollow cylindrical sidewall 22. The endwall 20 comprises a generally planar radially extending circular disc having a central, axially extending hollow neck 21 mounted on a central hub 24 which in turn is mounted on a rotatable shaft 25 that may comprise either a drive shaft or a driven shaft rotatable about an axis 27. The mounting neck is brazed or otherwise suitably fixed to the shaft 25.

The cup-shaped member 16 is one piece and comprises sheet steel. The sidewall 22 comprises a right circular, hollow cylinder having, at its axially inner end, a radially extending fold portion 30 folded over on itself to provide an axially inner, sheave tread retaining flange having an axial thickness equal to twice the wall thickness of the cup-shaped member 16. The double thickness fold 30 includes parallel flange portions 31 and 33 coupled by a web portion $w$. The flange portion 31 lies in the plane of the end wall 20.

Mounted on the cylindrical sidewall 22 is a hollow, cylindrical sheave tread or belt receiving member 32 which may suitable comprise aluminum or steel. The sheave tread 32 includes a plurality of V-shaped, circumferentially extending, generally parallel annular grooves 34 defining a plurality of inverted V-shaped, circumferentially extending, generally parallel, annular serrations, teeth or projections 37. The annular sheave tread grooves 34 receive the circumferentially extending belt pyramids 12. As illustrated in FIG. 2, the terminal ends 35 of the belt pyramids 12 are spaced from the roots 36 of the pulley grooves 34 by gaps G.

Similarly, the terminal ends 39 of the sheave tread projections or serrations 37 are spaced from the roots 41 of the belt grooves 14 by expansion gaps $g$ equal in depth to the expansion gaps G. The gaps $g$ and G permit relative expansion of the belt and sheave tread.

As illustrated in FIG. 2, the terminal ends 35 of the belt pyramids 12 have a radius of curvature R which is substantially greater than the radius of the curvature $r$ of the roots 36 of the grooves 34. Similarly, the terminal ends 39 of the annular sheave tooth portions 37 between the grooves 34 have a radius of curvature R which is greater than the radius of curvature $r$ of the roots 41 of V-slots 14 in the belt 10.

As illustrated in the drawings the radial thickness of the sheave thread pyramids 37 is substantially less than the overall radial thickness of the sheave tread 32.

The axially terminal end portion 40 of the mounting cup sidewall 22 is bent radially outwardly into a plane perpendicular to the axis 27 into abutting relation with the outer face 42 of the belt receiving sheave 32. The sheave tread 32 is thus tightly sandwiched between the parallel flanges 40 and 30. A plurality of circumferentially spaced locking dimples 44 are pressed in the annular flange 40 and axially outer face 42 of the sheave tread 32 to further inhibit relative rotation of the annular sheave 32 and the mounting hub 16.

Although the belt receiving grooves 34 are machined in the sheave tread cylinder 32, it should be understood that the sheave tread cylinder 32 could be cast or molded with the grooves 34 initially cast or molded therein.

METHOD OF MAKING

Referring now more particularly to FIGS. 3-11, a unitary piece of sheet metal is initially stamped or pressed in a two step operation to form a cylindrical, cup-shaped blank B having a base or endwall 20 and an integral cylindrical sidewall 22'. When the blank B is stamped, the hollow mounting neck 23 is formed therein. The cup shaped blank B is placed into a lower mold member M having a central, annular slot 46 for receiving the neck 23. The lower mold includes an annular, confining ring 48 which receives the cup-shaped blank B having an axial depth 49 equal to the axial thickness of the double wall fold 30 of the finished workpiece. The annular flange retaining ring 48 is spaced from the cup-shaped member sidewall 22' by an annular gap 50.

The terminal end 40 of the cup-sidewall 22' is received in an annular slot 52 provided in an upper press 54 which is vertically movable from the removed position illustrated in FIG. 4 to the closed position illustrated in FIG. 7. The upper press 54 includes a central boss 56 which projects slightly beyond the remaining lower face 58 of the press 54 and bears against the inner surface 22a of the wall cup shaped wall 22'. The central boss 56 radially supports a portion 57 of the sidewall 22 between the endwall 20 and the portion of the sidewall 22 received in the annular slot 52. The radial distance of the group 50 between the inside of the annular retaining ring 48 and the outer surface 47 of the projecting boss 56 is equal to the radial height of the finished fold 30.

The press 54 is moved downwardly from the removed position illustrated in FIG. 4 to the position illustrated in FIG. 5 to exert an axial force on the terminal end 40 of the sidewall 22' in the direction of the arrow 60. The centrally disposed, wall supporting, upper press boss 56 radially internally supports the sidewall 22' such that when the axial force is exerted in the direction of the arrow 60, the portion 57 of the sidewall 22' inwardly of the surface 58 will bulge radially outwardly. As the upper press moves from the position shown in FIG. 4 to the position illustrated in FIG. 5, pressure is applied to opposite sides of the crown of the bulge to fold the metal flat upon itself in the manner illustrated. As the upper press 54 continues toward the lower mold M to the position illustrated in FIG. 6, the bulged portions 57 will collapse and be pressed together. The upper press 54 continues toward the lower mold M and the double thickness wall fold 30 is formed at the end of the stroke of the upper press 54, the boss 56 will bear against the inside of the cup endwall 20. FIG. 8 shows the partially manufactured pulley in which the bulge 57 has been crimped together to form the double thickness wall flange 30 at the axially inner end of the finished sidewall 22.

The partially finished workpiece is then removed from the press 54 and the mold M and a cylindrical belt receiving, sheave tread 34 is slid onto the cylindrical mounting wall 22 into abutting relation with the double fold flange 30. The reduced diameter neck 23 is mounted on the hub 24 which in turn is mounted on a rotatable mandrel 64. A flaring tool 66 (FIG. 9) is moved axially inwardly into engagement with the terminal end portion 40 of the wall 22 while the partially completed cup-shaped member 16 is rotated to progressively bend the terminal end 40 radially outwardly into a plane perpendicular to the axis 27 into abutting relation with the axially outer surface 42 of the sheave tread 34. A dimpling tool, schematically designated 68, then is moved into engagement with the end flange 40 for providing a plurality of circumferentially disposed indentations or locking dimples 44 which further prevent relative rotational movement of the sheave tread 32 and the mounting cup 16.

A machine tool 70 is provided for cutting a plurality of grooves 34 in the sheave tread 32 as the pulley hub 16 and the tread 32 are rotated.

As illustrated in the drawings, the inner diameters of the fold 30 and the outer flange 40 are equal. Because the grooves are machined in the sheave tread 32 after it is mounted on the wall 22, eccentricity is minimized. The hub 24 is removed from the mandrel and thereafter mounted on a rotatable shaft. The belt 10 is then trained around the pulley to transmit energy between the belt and the shaft.

ALTERNATE EMBODIMENT

Figure 12:
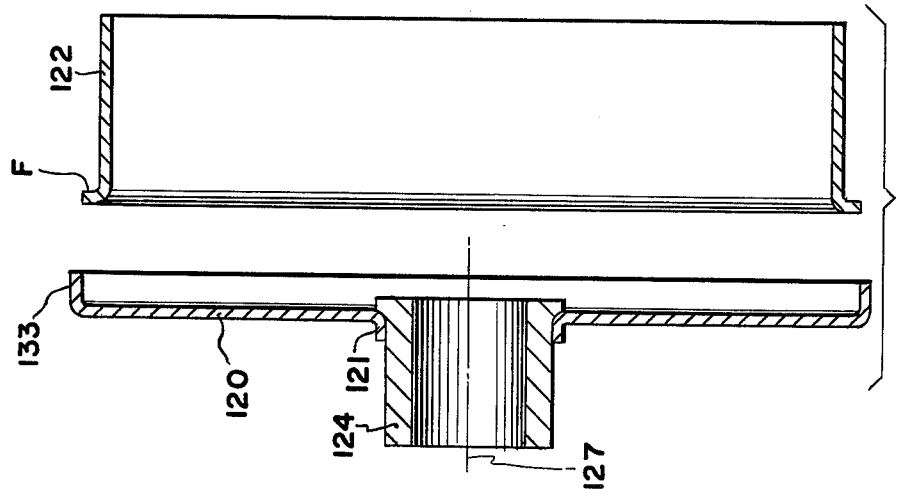

Referring now more particularly to FIGS. 12–15, a pulley, generally designated 116, is disclosed and is generally similar to the pulley 16. Generally similar parts are identified by the same numeral preceeded by the prefix 1. The pulley 116 includes a generally planar, circular end wall 120 having a hollow neck 121 press fit on a central mounting hub 124. The end wall 120 includes a flange 133 which is initially, axially disposed as illustrated in FIG. 12.

Figure 13:
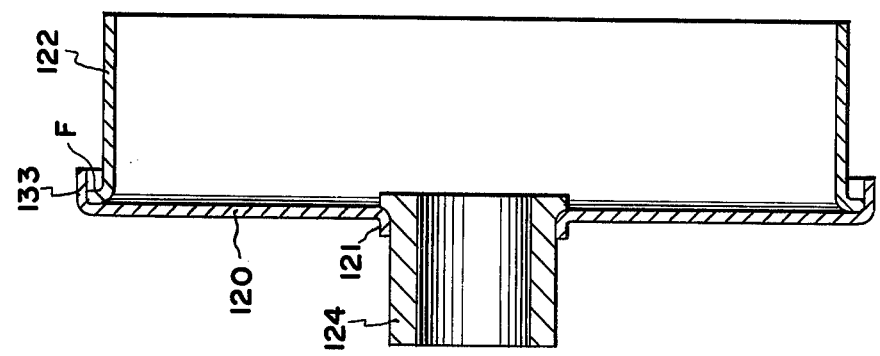

A generally, hollow, cylindrical, sidewall member 122 is provided and includes a rearwardly, outwardly flaring annular flange F which is disposed in abutting relation with the end wall 120 as illustrated in FIG. 13. The flange 133 is radially folded inwardly to the position illustrated in FIG. 14 on opposite sides of the flange F to secure the flange F. End wall 120 and side wall 122 may suitably comprise sheet steel.

Mounted on the cylindrical sidewall 122 is a hollow cylindrical sheave tread or belt receiving member 132 identical to the sheave tread 32 previously described. The axially terminal end portion 140 of the sidewall 122 is bent radially outwardly to the position illustrated in FIG. 15 after the sheave tread 132 is mounted on the sidewall 122. A plurality of circumferentially spaced locking dimple 144 are pressed in the annular flange 140 and axially outer face 142 of the sheave tread 142 to hold same in position.

It is to be understood that the drawings and descriptive matter are in all cases to be interpreted as merely illustrative of the principles of the invention, rather than as limiting the same in any way, since it is contemplated that various changes may be made in various elements to achieve like result without departing from the spirit of the invention or the scope of the appended claims.

What I claim is:

1. A method of making a rotary pulley for transmitting rotative movement between a rotatable element and a belt with a one-piece, hollow cup-shaped blank having a radially extending endwall hub mounting a radially outer, axially extending sidewall comprising the steps of:

exerting axially compressive forces on said sidewall while radially supporting the terminal end portion of said sidewall to outwardly bulge an axially inner portion of said sidewall adjacent said endwall;

axially compressing the axially inner bulge portion to form a radially outwardly projecting, double wall thickness, annular retaining fold at the axially inner end of said sidewall; and thereafter radially outwardly flaring said terminal end portion of said sidewall to form a radially outwardly projecting annular retaining flange.

2. The method as set forth in claim 1 including, prior to said flaring step, the step of mounting a hollow, belt receiving, cylinder on the outer peripheral surface of said sidewall.

3. The method as set forth in claim 2 wherein said mounting step is accomplished by axially sliding said cylinder over said sidewall into abutting engagement with said axially inner fold and the flaring step is accomplished by radially outwardly flaring the terminal end of said sidewall into abutting engagement with the axially outer end face of said cylinder to secure said cylinder.

4. The method as set forth in claim 3 including the step of thereafter forming a plurality of parallel, belt receiving, annular grooves in the outer peripheral surface of said cylinder.

5. The method as set forth in claim 4 wherein the depth and width of each of said grooves is substantially less than the radial thickness as axially width, respectively of said cylinder.

6. The method as set forth in claim 1 including the step of radially supporting at least a portion of the radially inner surface of said sidewall axially inwardly of said outer end portion when said compressive forces are exerted on said sidewall.

7. The method as set forth in claim 6 including the step of positively securing said cylinder to said sidewall to prevent relative rotation of said cylinder and said sidewall.

8. A rotary pulley for transmitting rotative movement between a rotatable element and a belt comprising:

a one-piece, generally cup-shaped hub having
        a radially extending endwall for mounting the pulley for rotation about an axis, and
        an integral, hollow cylindrical sidewall extending axially outwardly away from said endwall;
    said sidewall including a radially outwardly extending, double wall thickness, annular retaining fold at the axially inner end thereof, and a radially outwardly flaring, annular retaining flange at the axially outer end of said sidewall.

9. The pulley as set forth in claim 8 including a one-piece belt receiving hollow cylinder mounted on the outer peripheral surface of said sidewall disposed between and in abutting relation with said fold and said flange.

10. The pulley as set forth in claim 9 wherein said cylinder has a plurality of generally parallel, annular, belt receiving grooves in the outer peripheral surface thereof.

11. The pulley as set forth in claim 10 wherein the radial depth of said grooves is substantially less than the radial thickness of said cylinder.

12. The pulley as set forth in claim 8 wherein said sidewall comprises a right circular cylinder.

13. The pulley as set forth in claim 8 wherein said sidewall comprises a right circular cylinder and the radially inner edges of said fold and said flange terminate at said sidewall substantially the same distance from the axis.

14. The pulley as set forth in claim 8 wherein said double thickness fold includes parallel flange portions coupled by a web, one of said flange portions lying in the plane of said endwall.

15. A method of making a pulley utilizing a one-piece, hollow, cup-shaped member having a load supporting endwall mounting a hollow cylindrical sidewall comprising the steps of:

radially outwardly bulging the axially inner portion of said sidewall adjacent said endwall;

pressing the axially opposite sides of the radially outwardly bulged portion of said sidewall toward each other to form a double wall thickness, annular retaining fold at the axially inner end of said sidewall adjacent said endwall; and thereafter bending the terminal end portion of said sidewall radially outwardly to provide an annular retaining flange at the axially outer end of said sidewall.

16. The method as set forth in claim 15 wherein the inner diameter of said fold is equal to the inner diameter of said flange 17. The method as set forth in claim 15 including the step of mounting a belt receiving, hollow cylindrical sheave tread on said sidewall prior to said bending step.

18. The method as set forth in claim 15 including the step of providing a plurality of generally parallel circumferential grooves in said sheave tread.

19. The method as set forth in claim 18 wherein the step of providing said grooves is accomplished after said sheave tread is mounted on said sidewall.

20. A rotary pulley for transmitting rotative movement between a rotatable element and a belt comprising:

a generally cup shaped hub having a radially extending endwall for mounting the pulley for rotation about an axis; and an axially extending hollow cylindrical sidewall extending axially away from said endwall;

an axially inner annular retaining flange at the junction of said endwall and sidewall extending radially outwardly of the inner end of said sidewall; and an annular retaining flange at the axially outer end of said sidewall.

21. The pulley as set forth in claim 20 including a onepiece, belt receiving cylinder mounted on the outer peripheral surface of said sidewall in abutting relation with said flanges.

22. The pulley as set forth in claim 21 wherein said axially inner flange comprises a double wall thickness fold on one of said endwall and sidewall.

23. The pulley as set forth in claim 21 wherein said double wall thickness fold includes axially spaced fold portions provided at the radially outer peripheral edge of said endwall, said sidewall including a radially outwardly flaring, annular flange sandwiched between said fold portions.

24. The pulley as set forth in claim 21 wherein said axially inner flange comprises a radially outwardly flaring integral portion of at least one of said sidewall and said endwall.

25. A rotary pulley for transmitting rotative movement between a rotatable element and a belt comprising:

a generally cup shaped hub having a radially extending endwall for mounting the pulley for rotation about an axis; and an axially extending hollow cylindrical sidewall extending axially away from said endwall, and joined to said endwall by a multi-wall thickness annular retaining fold at the axially inner end of said sidewall;

the axially outer end of said sidewall terminating in a radially outwardly flaring annular retaining flange.

26. A method of making a rotary pulley for transmitting rotative movement between a rotatable element and a belt with a onepiece, hollow cup-shaped blank having a radially extending endwall hub mounting a radially outer, axially extending sidewall comprising the steps of:

mounting a hollow, belt receiving, cylinder on the outer peripheral surface of said sidewall;

exerting axially compressive forces on said sidewall while radially supporting the terminal end portion of said sidewall to outwardly bulge an axially inner portion of said sidewall adjacent said endwall;

axially compressing the axially inner bulge portion to form a radially outwardly projecting, double wall thickness, annular retaining fold at the axially inner end of said sidewall for abutting the axially inner end of said sidewall; and radially outwardly flaring said terminal end portion of said sidewall to form a radially outwardly projecting annular retaining flange for abutting the axially outer end of said cylinder.

27. The method set forth in claim 26 wherein said comprising step is accomplished by forming said fold with an axially inner, radially extending fold portion lying in the plane of said endwall and an axially outer confronting fold portion coupled to said axially inner fold portion by a web.

* * * * *